United States Patent [19]

Filter et al.

[11] Patent Number: 4,582,352

[45] Date of Patent: Apr. 15, 1986

[54] LIVE-LINE SEPARABLE INSULATED CONNECTOR TOOL

[76] Inventors: Reinhard Filter, 14 Charles St., Georgetown, Ontario, Canada, L7G 2Z2; Allan S. Jones, 23 Tromley Dr., Islington, Ontario, Canada, M9B 5Y4

[21] Appl. No.: 676,397

[22] Filed: Nov. 29, 1984

[51] Int. Cl.[4] .......................... B25B 27/14; B25J 1/00

[52] U.S. Cl. ...................................... 294/19.1; 81/3.8; 81/53.1

[58] Field of Search ...................... 294/19.1, 19.3, 1.1; 81/3.8, 53.1; 29/283, 278

[56] References Cited

U.S. PATENT DOCUMENTS 3,840,969 10/1974 Landis ............................... 294/19.1

3,871,056 3/1975 Lyons et al. ....................... 294/19.1

4,244,613 1/1981 Tillman ............................. 294/19.1

*Primary Examiner*—James B. Marbert

*Attorney, Agent, or Firm*—Ridout & Maybee

[57] ABSTRACT

A live-line loadbreak tool for use with separable insulated connectors incorporates features which facilitate safe and rapid handling of the connectors during switching operations. One feature is a grasping mechanism which positively engages a connector so as to ensure its safe handling after it has been pulled. Another feature is an impact mechanism consisting of a slide hammer which differs from conventional impact tools in that it is adapted to be grasped with both hands, and in that it is automatically latched at the end of its working stroke.

12 Claims, 9 Drawing Figures

LIVE-LINE SEPARABLE INSULATED CONNECTOR TOOL

This invention relates to a live-line loadbreak tool for use with high voltage separable insulated connectors.

One well known type of separable insulated connector, known as a loadbreak elbow, comprises a sheath or body portion which, in use, engages over the bushing of a high voltage terminal, and a leg portion projecting angularly from the body portion, usually at right angles. To facilitate removal of the connector from the bushing, a pulling eye is provided at one end of the body portion.

A conventional loadbreak tool for pulling the connector from the bushing comprises a hand-held insulative pole having at its operative end a grasping mechanism for engaging the connector. Since the user must apply a considerable force to pull the connector from the terminal bushing, additional means such as a slide hammer may be incorporated in the tool to supplement the steady pull exerted by the user. However, conventional tools are hazardous to use under loadbreak conditions, particularly if the connector has become seized to the bushing as is often the case, because the user does not have complete control over the manipulation of the connector, or at least certain elements of the tool momentarily after the pull has been effected. The hazard arises from two causes. In the first place with the conventional tools the connector is not held firmly in a position suitable for further steps in the operating sequence. Also, when a slide hammer is incorporated, the user is not able to use both hands to hold the tool steady since one hand is used to slide the hammer and cannot be positively located on the pole.

The present invention provides a loadbreak elbow tool which, in contrast to the conventional tools, will allow safe and rapid switching of separable insulated connnectors (loadbreak elbows) under normal operation conditions.

The invention also provides a loadbreak elbow tool having a novel elbow grasping mechanism which ensures safe handling of the elbow connector once it has been pulled.

In order that the invention may be readily understood one live-line loadbreak elbow tool in accordance with the invention will now be described, by way of example, with reference to the accompanying drawings.

Figure 4A:
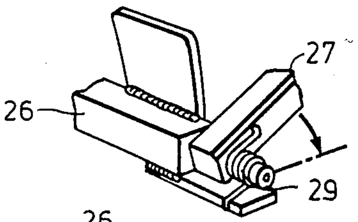
Figure 6:
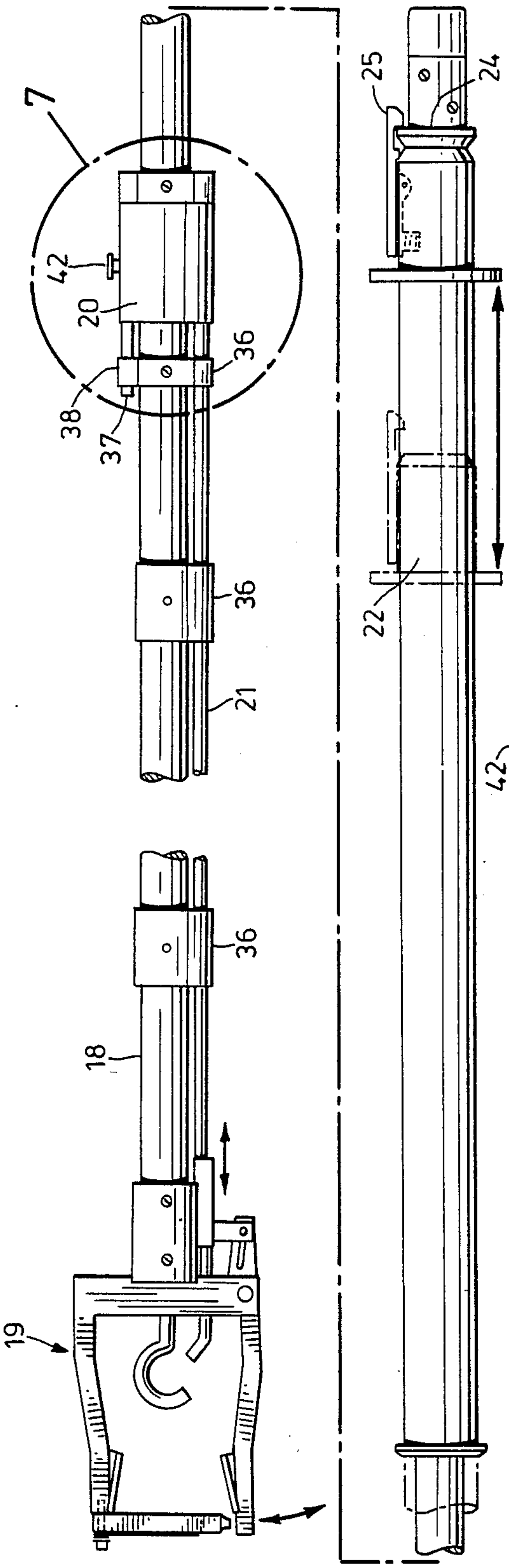
Figure 7:
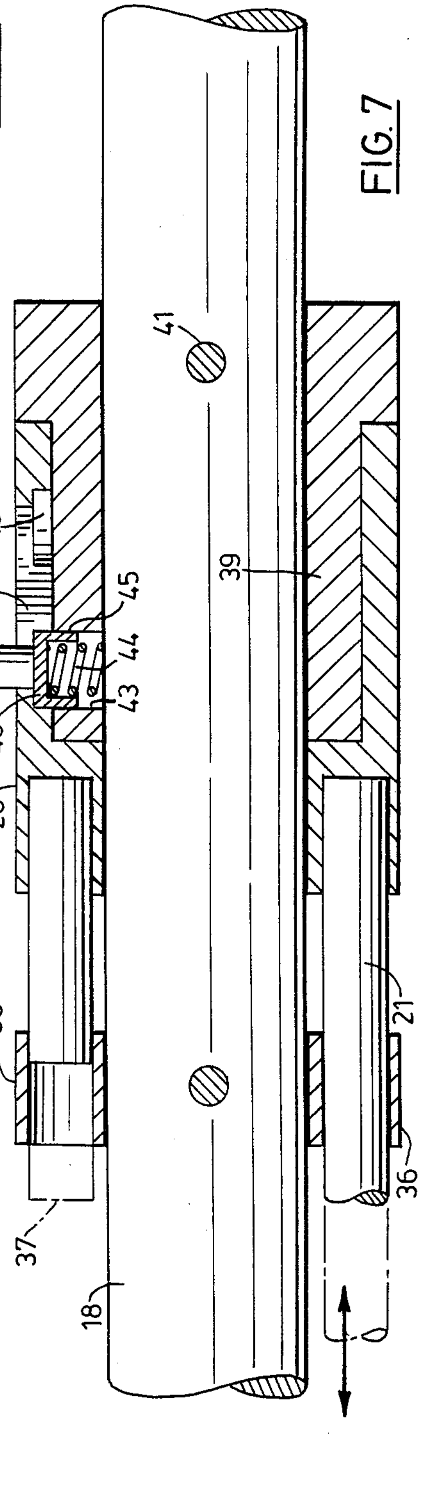

FIG. 4*a* illustrates a detail of the working head of the tool;

FIG. 6 is a broken side elevational view of the tool;

FIG. 7 shows a detail of FIG. 6 in section; and

Figure 8:
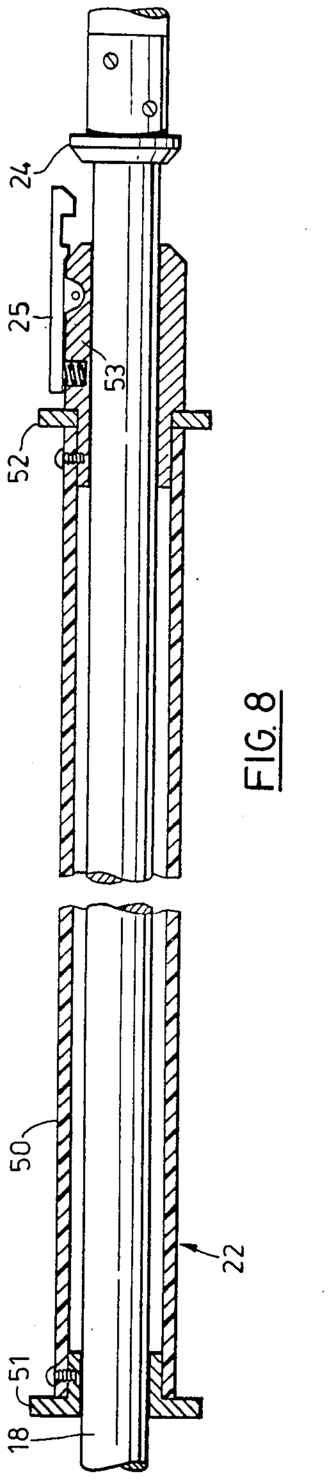

FIG. 8 is a longitudinal sectional view of a slide hammer which is incorporated in the tool.

Figure 1:
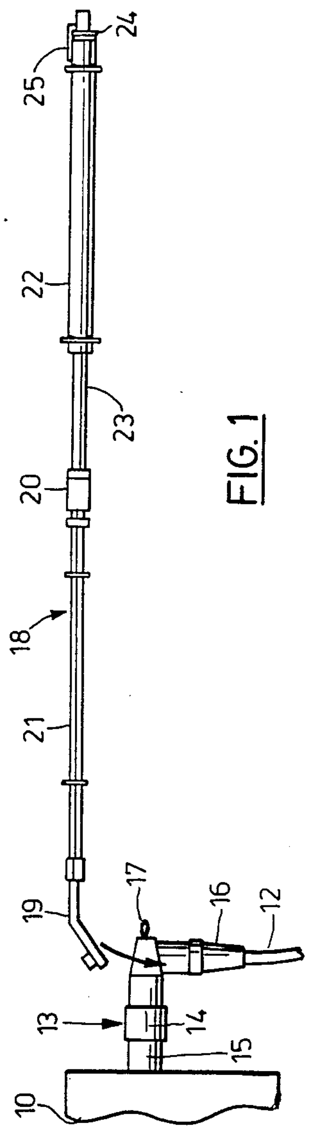
FIG. 1 is a side elevational view of the tool positioned to engage a loadbreak elbow.
Figure 2:
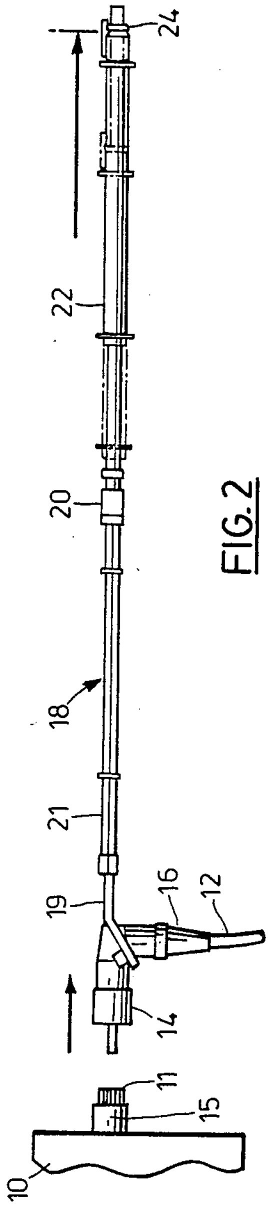
FIG. 2 is a view corresponding to FIG. 1 but showing the tool after the elbow has been pulled.

Referring to FIGS. 1 and 2, an electrical component such as a distribution transformer 10 has a terminal 11 to which a cable 12 is connected by a separable insulated connector 13. The connector 13, or loadbreak elbow, is of the type having an insulating sheath or body portion 14 which is fitted on the terminal bushing 15, and a leg portion 16 which projects at right angles from the body portion. The closed end of the body portion 14 is furnished with a pulling eye 17.

The loadbreak tool for disconnecting the cable under loadbreak conditions comprises a longitudinally extending pole 18 having a grasping mechanism 19 at its forward end for engaging the connector 13. The pole is preferably of fibre glass reinforced resin or like rigid insulating material. Near the midpoint of the pole is a sleeve 20 from which a control rod 21 extends. The purpose of the sleeve and the control rod will be described hereinafter. A slide hammer 22 serving as an impact tool is slidably mounted on a cylindrical guide portion 23 towards the rearward end of the pole, the slide hammer being sufficiently long to be manually graspable by both hands of the operator and being slidable along said guide portion 23 between a forward limit position and a rearward limit position. The forward limit position is defined by the sleeve 20 serving as an abutment stop. FIG. 1 shows the slide hammer 22 in its rearward position defined by a rearward abutment stop 24. The abutment stop 24 also serves as a catch member which, in the rearward position of the slide hammer 22, is automatically engaged by a spring-loaded pivoted latch lever 25 to retain the slide hammer positively in the rearward position once it has been actuated by both hands of the operator. In this way, since the slide hammer is prevented from sliding, the user can, with both hands remaining on the slide hammer, exercise greater control over the manipulation of the tool.

Figure 3:
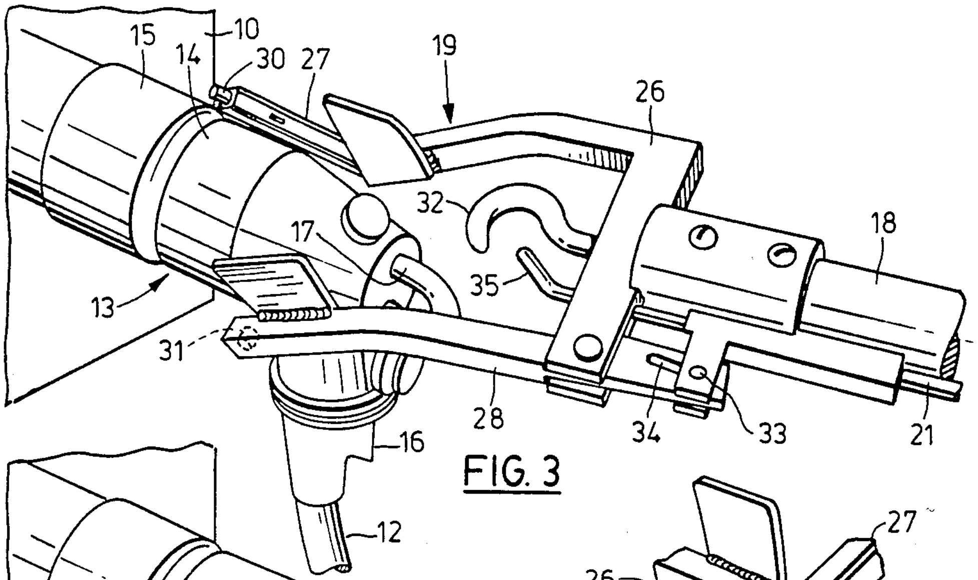
FIGS. 3, 4 and 5 illustrate sequential steps in engaging the tool with the loadbreak elbow for removing the elbow from its bushing.
Figure 4:
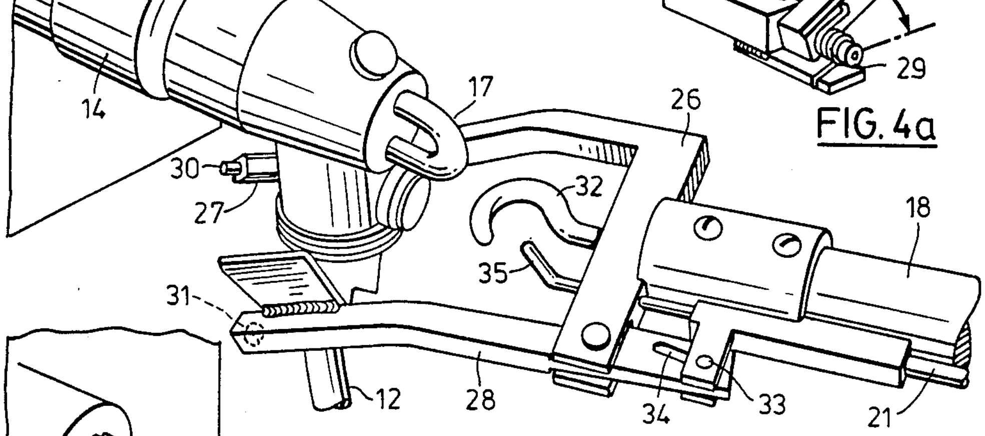
Figure 5:
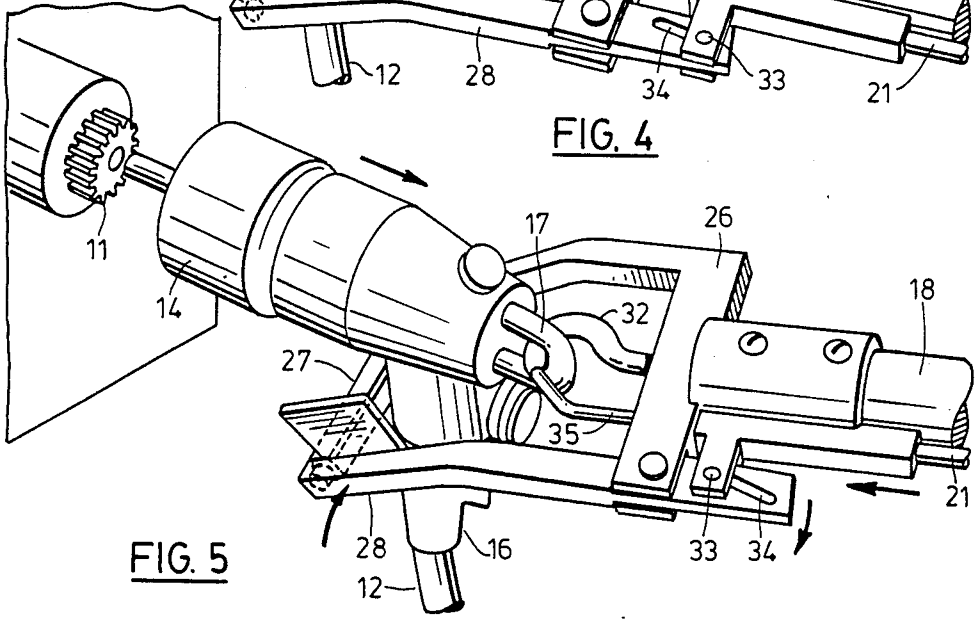

The grasping mechanism 19 at the forward end of the pole 18 is best illustrated in FIGS. 3, 4 and 5. This comprises an angle member 26 rigidly mounted at the forward end of the pole 18, the angle member having transverse and longitudinal leg portions, a first bar member 27 and a second bar member 28. The first bar member 27 is pivotally mounted at one end of the angle member 26 for pivotal movement about a longitudinal axis. As shown in FIGS. 3, 4 and 5, the bar member 27 is free to pivot to and from a limit position. FIG. 5 shows the bar member in its limit position, wherein it lies parallel to the transverse leg portion of the angle member 26. The bar member 27 is resiliently biased towards the limit position by a spring 29 as shown in FIG. 4*a*.

The second bar member 28 is pivotally mounted at the other end of the angle member 26 for pivotal movement about a transverse axis, this transverse axis in the present example being perpendicular to the plane of the angle member 26. The bar member 28 is thus pivotally movable to and from a limit position in which it extends longitudinally and substantially parallel to the longitudinal leg portion of the angle member 26.

The ends of the first and second bar members are formed, respectively, with a spigot 30 and cooperating socket 31. When the first and second bar members are in their respective limit positions they are rigidly interlocked by the spigot and socket joint; thus they define with the angle member 26 a four-sided closed loop which is adapted to encircle the leg portion 16 of the loadbreak elbow 13. A hook 32 is mounted rigidly on the transverse leg portion of the angle member 26. As shown in the drawings this hook 32 extends longitudinally into the loop and is positioned so as to engage the pulling eye 17 of the elbow.

In order to engage the grasping mechanism with the loadbreak elbow the bar member 28 must first be pivoted away from its limit position so as to open the device. This is achieved, by retracting the control rod 21, at the forward end of which is a pin 33 engaging in a cam slot 34 provided in a rearward extension of the bar member 28. This cam slot 34 lies in the plane of the angle member 26, that is to say, in a plane transverse to the transverse pivotal axis of the bar member 28. Retraction of the control rod 21 also opens the hook 32 by retracting a finger or clasp 35 extending from the forward end of the control rod. The grasping mechanism can now be slipped over the loadbreak elbow in the manner shown in FIGS. 3 and 4, the first angle member 27 being displaced against the spring bias away from its limit position and being returned automatically to the limit position once it has cleared the body portion 14 of the loadbreak elbow. The hook 32 is next threaded through the pulling eye 17. Thereafter the user must return the control rod 21 to its forward position, thereby returning the finger 35 into clasping engagement with the hook 32 and returning the second bar member 28 to its limit position at which it is rigidly interlocked with the bar member 27. The resultant configuration, in which the loadbreak connector is securely held, is illustrated in FIG. 5. This position, in which the grasping mechanism is securely locked, may be indicated by an indicator button operated by the spigot 30.

The longitudinally movable control rod 21 is mounted alongside the pole 18 in sliding relation to it. The control rod itself is, of course, also of electrically insulating material such as fibre glass reinforced plastic. Referring to FIG. 7, the sleeve 20 takes the form of a sliding collar to which the rear end of the control rod 21 is secured. The control rod 21 is constrained to be moved in the direction of its length by aligned bushes 36. Rotation of the sliding collar is prevented by means of a guide shaft 37 extending from the collar into a cylindrical bushing 38. A sleeve member 39 having a flange 40 is fixed onto the pole 18 by rivets 41 or similar fasteners. The sliding collar 20 telescopes onto the sleeve member 39 for sliding movement therealong, the flange 40 serving as an abutment stop. In order to maintain the grasping mechanism in its locked position or its unlocked position, depending on the manipulation being performed, it is necessary to lock the sliding collar 20 against sliding movement. For this purpose a spring-loaded plunger 42 is located in a recess 43 in the sleeve member 39, the plunger being biased by a spring 44. A cup 45 engaging in the recess 43 and an aligned recess 46 in the sliding collar 20 serves to lock the sliding collar in one of its operative positions as shown. The stem of the plunger 42 extends through a longitudinal slot 47 in the sliding collar.

In order to move the sliding collar 20 from one operative position to the other, in the present instance to advance the sliding collar from its rearward position for extending the control rod 21, it is necessary to depress the plunger so that the cup 45 clears the recess 46. The sliding collar 20 can then be slid to the forward operative position at which the cup 45 enters a second recess 48. The control rod 21 is thus locked in its extended position.

Referring to FIG. 6, the slide hammer 22 which is slidably mounted on the pole 18 comprises a long outer cylinder 50 of fibre glass reinforced plastic or like rigid insulating material, to the ends of which are fitted annular steel collars 51 and 52 serving as forward and rearward anvils. These collars strike the forward and rearward abutment stops 20, 24 respectively, at the ends of the hammer strokes. An internal weight 53 in the form of a hollow cylinder is inserted into the rearward end of the cylinder 20, the weight 53 serving to impart sufficient mass to impart adequate momentum to the slide hammer when it is operated.

It is important that the slide hammer 22 be long enough to enable the operator to grasp it with both hands spaced at a convenient distance. It is also important that the weight 53 be sufficiently heavy to impart sufficient momentum to the slide hammer. In practice the slide hammer should be between 85 cms and 91 cms in length, preferably 88 cms, and the total mass of the slide hammer with its weight 53 should be between 2 kg. and 3 kg., preferably 2.5 kg.

In operation, the slide hammer differs fundamentally from the slide hammers of conventional tools, both by the fact that it is designed to be grasped by both hands of the operator, and by the fact that it is automatically retained in the rearward position once it has been operated. This absence of rebound, and above all the fact that the hammer is positively locked against further sliding movement during the moments immediately following switching of the loadbreak elbow, greatly facilitate safe manipulation of the tool during a switching operation.

What we claim is:

1. A live-line loadbreak tool for use with a high voltage separable insulated connector of the type having a body portion with a pulling eye at one end and a leg portion angularly projecting therefrom, said tool comprising a longitudinally extending insulative pole having a grasping mechanism at one end and carrying means for manipulating the grasping mechanism whereby to engage and disengage a connector to be separated from its bushing, said grasping mechanism comprising

- an angle member rigidly mounted at said one end of the pole,
- a first bar member pivotally mounted at one end of the angle member for pivotal movement about a longitudinal axis to and from a limit position,
- a second bar member pivotally mounted at the other end of the angle member for pivotal movement about a transverse axis to and from a limit position,
- said first and second bar members cooperating in their respective limit positions at their free ends to define with said angle member a four-sided closed loop adapted to encircle the leg portion of the connector,
- a hook rigidly mounted on the angle member, the hook extending into said loop and being positioned to engage the pulling eye of the connector, and
- manually operable means mounted on the pole at a position remote from said one end thereof, said manually operable means being insulatively interconnected with said second bar member for pivotally moving the bar member about said transverse axis.

2. A tool according to claim 1, wherein said first bar member is spring-biased towards its limit position.

3. A tool according to claim 2, wherein said first and second bar members are formed at their free ends with interengaging spigot and socket means which interlock when the bar members are brought into cooperative engagement in their respective limit positions.

4. A tool according to claim 3, wherein said manually operable means is insulatively interconnected with the second bar member by a longitudinally movable control rod extending along the pole, said manually operable means being operable to extend and retract the control rod, and coupling means interconnecting the control rod with the second bar member for pivotally moving the latter in accordance with extension and retraction of the control rod.

5. A tool according to claim 4, said coupling means comprising a first coupling member constituted by an extension of said second bar member, said extension being formed with a cam slot lying in a plane transverse to said transverse axis and a second coupling member carried by the forward end of the control rod and comprising a pin engaging in the slot.

6. A tool according to claim 4, further comprising a finger projecting longitudinally from the forward end of the control rod, the finger cooperating with said hook to form a clasp in the extended position of the control rod.

7. A tool according to claim 1, further comprising an impact device, the pole providing a cylindrical guide portion extending between forward and rearward abutment stops adjacent the rearward end of the pole, a manually operable slide hammer slidably mounted on said guide portion for sliding movement between forward and rearward positions defined by said stops, and spring-loaded latching means for automatically latching and retaining the slide hammer in its rearward position.

8. A tool according to claim 7, wherein said latching means comprises a spring-loaded latch member pivotally mounted on the slide hammer, said rearward abutment stop providing means for engaging the latch member in the rearward position of the slide hammer.

9. A live-line loadbreak tool for use with a high voltage separable insulated connector, comprising a longitudinally extending insulative pole having a grasping mechanism at one end for engagement with and disengagement from the connector, and impact producing means adjacent its other end, the pole providing a cylindrical guide portion extending between forward and rearward abutment stops adjacent said other end, said impact producing means comprising a slide hammer slidably mounted on said guide portion for sliding movement between forward and rearward positions defined by said abutment stops, and spring-loaded latching means for automatically latching and retaining the slide hammer in its rearward position.

10. A tool according to claim 9, wherein the slide hammer comprises a manually graspable open-ended cylinder of insulating material through which said guide portion of the pole extends, a metallic weight fitted into the cylinder, and metallic anvil members fitted onto the ends of the cylinder for engagement respectively with the abutment stops.

11. A tool according to claim 10, wherein the cylinder is between 85 cms and 91 cms in length.

12. A tool according to claim 11, wherein said weight is between 2 kg. and 3 kg.

* * * * *